United States Patent
Kim et al.

(10) Patent No.: US 12,074,310 B2
(45) Date of Patent: Aug. 27, 2024

(54) LITHIUM SECONDARY BATTERY

(71) Applicant: SK INNOVATION CO., LTD., Seoul (KR)

(72) Inventors: Soo Ho Kim, Daejeon (KR); Min Gu Kang, Daejeon (KR); Young Hoon Do, Daejeon (KR); Yong Hyun Cho, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/865,075

(22) Filed: Jul. 14, 2022

(65) Prior Publication Data

US 2022/0352494 A1  Nov. 3, 2022

Related U.S. Application Data

(63) Continuation of application No. 16/247,732, filed on Jan. 15, 2019, now Pat. No. 11,430,975.

(30) Foreign Application Priority Data

Jan. 15, 2018  (KR) .......................... 10-2018-0005123

(51) Int. Cl.
| | | |
|---|---|---|
| *H01M 4/131* | (2010.01) | |
| *H01M 4/36* | (2006.01) | |
| *H01M 4/505* | (2010.01) | |
| *H01M 4/525* | (2010.01) | |
| *H01M 10/0525* | (2010.01) | |

(52) U.S. Cl.
CPC .......... *H01M 4/131* (2013.01); *H01M 4/364* (2013.01); *H01M 4/505* (2013.01); *H01M 4/525* (2013.01); *H01M 10/0525* (2013.01)

(58) Field of Classification Search
CPC ...... H01M 4/131; H01M 4/364; H01M 4/505; H01M 4/525; H01M 10/0525
See application file for complete search history.

(56) References Cited

U.S. PATENT DOCUMENTS

| | | |
|---|---|---|
| 2011/0129734 A1 | 6/2011 | Konishi et al. |
| 2015/0349327 A1 | 12/2015 | Hwang et al. |
| 2017/0324091 A1 | 11/2017 | Hasegawa et al. |

(Continued)

FOREIGN PATENT DOCUMENTS

| | | |
|---|---|---|
| CN | 105009333 A | 10/2015 |
| KR | 10-2010-0130522 A | 12/2010 |

OTHER PUBLICATIONS

Notice of Allowance for Korean Patent Application No. 10-2018-0005123 issued by the Korean Intellectual Property Office on Jul. 14, 2022.

(Continued)

*Primary Examiner* — Brian R Ohara
*Assistant Examiner* — Patrick Marshall Greene
(74) *Attorney, Agent, or Firm* — IP & T GROUP LLP

(57) ABSTRACT

A lithium secondary battery comprises a cathode, an anode, a separator and a nonaqueous electrolyte solution. The cathode includes a first cathode active material in which at least one of metals included in the first cathode material has a concentration gradient region between a central portion and a surface portion, and a second cathode active material having a single particle structure. The lithium secondary battery has improved life-span and penetration stability.

13 Claims, 4 Drawing Sheets

(56) References Cited

U.S. PATENT DOCUMENTS

| | | | |
|---|---|---|---|
| 2019/0148725 A1* | 5/2019 | Choi | H01M 4/525 |
| | | | 429/220 |
| 2020/0083524 A1* | 3/2020 | Baek | H01M 4/587 |
| 2020/0235381 A1* | 7/2020 | Park | H01M 4/131 |
| 2020/0343547 A1* | 10/2020 | Yokoyama | H01M 10/0525 |
| 2021/0043920 A1* | 2/2021 | Kim | H01M 4/525 |

OTHER PUBLICATIONS

First Office Action on the Chinese Patent Application No. 201910034658.7 issued by the Chinese Patent Office on Jun. 19, 2023.

\* cited by examiner

LITHIUM SECONDARY BATTERY

CROSS-REFERENCE TO RELATED APPLICATION AND CLAIM OF PRIORITY

This application is a continuation of U.S. patent application Ser. No. 16/247,732 filed on Jan. 15, 2019, which claims priority to Korean Patent Applications No. 10-2018-0005123 filed on Jan. 15, 2018 in the Korean Intellectual Property Office (KIPO), the entire disclosure of which is incorporated by reference herein.

BACKGROUND

1. Field

The present invention relates to a lithium secondary battery. More particularly, the present invention relates to a lithium secondary battery including a lithium metal oxide as an active material.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

Recently, as the application range of the lithium secondary battery is being expanded, the lithium secondary battery may be operated in more harsh conditions, e.g., in a high temperature condition or a low temperature condition.

However, a lithium transition metal oxide or a lithium metal complex oxide used as a cathode active material of the lithium secondary battery may become thermally unstable because metal ingredients may be released or separated from the cathode when the lithium secondary battery is stored in a fully charged state at a high temperature. Further, an internal short circuit may be caused by an external shock to cause an ignition due to a drastic heat increase.

For example, Korean Publication of Patent Application No. 2006-0134631 discloses a cathode active material having a core portion and a shell portion, which may not provide sufficient life-span and stability.

SUMMARY

According to an aspect of the present invention, there is provided a lithium secondary battery having improved electrical and mechanical reliability and stability.

According to exemplary embodiments, a lithium secondary battery comprises a cathode including a first cathode active material and a second cathode active material, an anode and a separator interposed between the cathode and the anode. The first cathode active material includes a lithium metal oxide including a concentration gradient region between a central portion and a surface. The second cathode active material includes a lithium metal oxide having a single particle structure.

In some embodiments, the single particle structure may include a single crystalline structure.

In some embodiments, the first cathode active material may include a first lithium metal oxide represented by Chemical Formula 1.

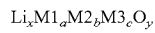   [Chemical Formula 1]

In Chemical Formula 1, at least one of M1, M2 and M3 may have a concentration gradient region between a central portion of the first metal oxide and a surface portion of the first metal oxide. In Chemical Formula 1, M1, M2 and M3 may be selected from Ni, Co, Mn, Na, Mg, Ca, Ti, V, Cr, Cu, Zn, Ge, Sr, Ag, Ba, Zr, Nb, Mo, Al, Ga or B, $0<x\leq1.1$, $2\leq y\leq2.02$, $0\leq a\leq1$, $0\leq b\leq1$, $0\leq c\leq1$, and $0<a+b+c\leq1$.

In some embodiments, M1 may be Ni, $0.6\leq a\leq0.95$ and $0.05\leq b+c\leq0.4$ in Chemical Formula 1.

In some embodiments, M1 may be Ni, $0.7\leq a\leq0.9$ and $0.1\leq b+c\leq0.3$ in Chemical Formula 1.

In some embodiments, the second cathode material may include a second lithium metal oxide represented by Chemical Formula 2.

   [Chemical Formula 2]

In the Chemical Formula 2, M4 may include at least one selected from Ti, Zr, Al, Mg or Cr, M5 may include at least one selected from Sr, Y, W or Mo, $0<x<1.5$, $2\leq y\leq2.02$, $0.313\leq a\leq0.353$, $0.313\leq b\leq0.353$, $0.313\leq c\leq0.353$, $0\leq d\leq0.03$, $0\leq e\leq0.03$ and $0.98\leq a+b+c\leq1.02$.

In some embodiments, the second lithium metal oxide may include $Li_{1.0}Ni_{1/3}Co_{1/3}Mn_{1/3}O_2$.

In some embodiments, the second cathode active material may have a primary particle shape.

In some embodiments, the second cathode active material may show an exothermic peak of 25 J/g or less at 320° C. or more in a DSC measurement.

In some embodiments, a blending weight ratio of the first cathode active material and the second cathode active material may be in a range from 80:20 to 10:90.

In some embodiments, a blending weight ratio of the first cathode active material and the second cathode active material may be in a range from 50:50 to 10:90.

According to exemplary embodiments as described above, a lithium secondary battery having high energy density may be realized by employing a cathode active material having a concentration gradient and a cathode active material having a single crystalline particle structure. Additionally, overcharge and penetration stability, and life-span of the lithium secondary battery may be also improved.

DETAILED DESCRIPTION OF THE EMBODIMENTS

Figure 1A:
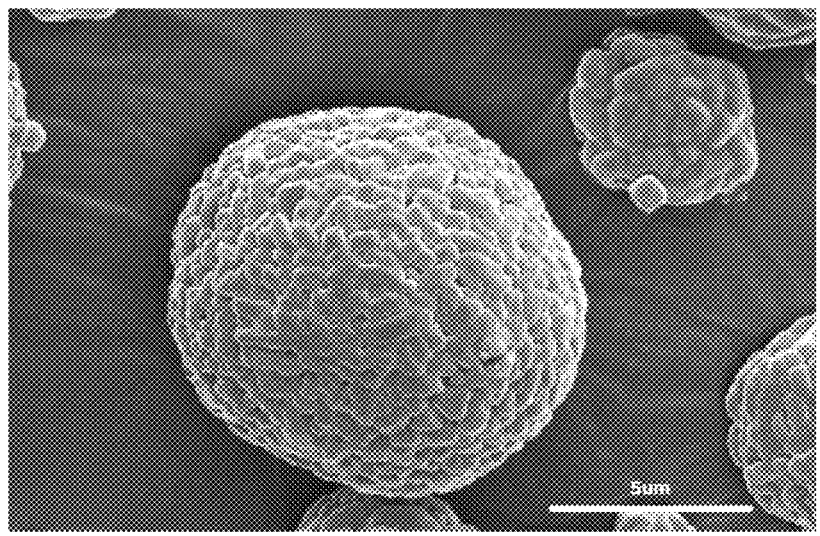
FIGS. 1A and 1B are SEM (Scanning Electron Microscopy) images illustrating a lithium metal oxide having a secondary particle structure formed from a plurality of primary particles.

According to exemplary embodiments of the present invention, a lithium secondary battery comprising a cathode that includes a first cathode active material having a concentration gradient region and a second cathode active material having a single particle structure is provided. The lithium secondary battery further includes an anode and a separation layer interposed between the cathode and the anode. The lithium secondary battery may have improved overcharging and penetration stability, and enhanced life-span.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "a first" and "a second" used herein are not intended to specify the number or the order of objects, but are only used to identify different elements or objects to each other.

<Cathode>

According to exemplary embodiments, a cathode of the lithium secondary battery may include a first cathode active material and a second cathode active material. The first cathode active material may include a concentration gradient region between a central portion and a surface portion, and the second cathode active material may have a single particle structure. In exemplary embodiments, the first cathode active material may include a first lithium metal oxide in which at least one metal included therein may have a concentration gradient region between a central portion and a surface portion, so that the life-span of the lithium secondary battery may be greater than that of the lithium secondary battery including a cathode active material with a fixed concentration.

The term "concentration gradient region" used herein may indicate a region having concentration profile which may be changed with a uniform trend or tendency between the central portion and the surface portion. The uniform trend may include an increasing trend or a decreasing trend. However, a partial deviation or a partial different trend in the concentration gradient region is also encompassed without departing from the scope of the present inventive concepts.

In some embodiments, the term "central portion" used herein may encompass a region within a radius of about 0.1 µm from a central point of a cathode active material particle. The term "surface portion" used herein may indicate a region within a thickness of about 0.1 µm from an outermost surface of the cathode active material particle.

The first lithium metal oxide may be represented by Chemical Formula 1 below.

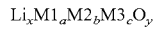    [Chemical Formula 1]

In Chemical Formula 1 above, M1, M2 and M3 may include at least one selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1 $0<x\le1.1$, $2\le y\le2.02$, $0\le a\le1$, $0\le b\le1$, $0\le c\le1$, and $0<a+b+c\le1$.

In exemplary embodiments, at least one of M1, M2, and M3 may have a continuous concentration gradient from the central portion to the surface portion.

In some embodiments, at least one of M1, M2, and M3 may have a concentration gradient region in which a concentration increases from the central portion to the surface portion, and the others may have a concentration gradient region in which a concentration decreases from the central portion to the surface portion.

In some embodiments, one of M1, M2, and M3 may have a concentration gradient region in which a concentration increases from the central portion to the surface portion, and another may have a concentration gradient region in which a concentration decreases from the central portion to the surface portion, and the other may have a constant concentration from the central portion to the surface portion.

For example, M1, M2, and M3 may be Ni, Co, and Mn, respectively. Ni may have a concentration gradient region in which a concentration decreases from the central portion to the surface portion. Co may have a constant concentration from the central portion to the surface portion. Mn may have a concentration gradient region in which a concentration increases from the central portion to the surface portion.

In some embodiments, the first lithium metal oxide may have a relatively high content of nickel (Ni).

For example, in the first lithium metal oxide according to the present invention, a molar ratio of nickel may be about 0.6 to about 0.95, preferably about 0.7 to about 0.9. When M1 is Ni in Chemical Formula 1 above, $0.6\le a\le0.95$ and $0.05\le b+c\le0.4$, preferably $0.7\le a\le0.9$ and $0.1\le b+c\le0.3$.

In some embodiments, particle size of the first lithium metal oxide is not specifically limited, for example, about 3 µm to about 25 µm.

In some embodiments, the first cathode active material may further include a coating layer on the first lithium metal oxide. The coating layer may be formed by including metals or metal oxides. For example, the coating layer may include Al, Ti, Ba, Zr, Si, B, Mg, P, an alloy thereof or an oxide thereof. These may be used alone or in a mixture thereof.

In an embodiment, the first cathode active material according to an embodiment of the present invention may be the first lithium metal oxide doped with a metal component. A dopable metal may be Al, Ti, Ba, Zr, Si, B, Mg, P, V, W and combinations thereof.

A conventional cathode active material has used nickel to improve capacity of a battery. However, when a content of nickel is increased, a life-span and cell stability of the battery is decreased.

The cathode active material according to exemplary embodiments of the present invention may use a cathode active material having high Ni-content and a cathode active material having a single particle structure, to prevent decrease of life-span and improve cell stability. Therefore, the lithium secondary battery using the cathode active material according to the embodiments of the present invention may obtain improved life-span, overcharging and penetration stability while maintaining a high capacity.

According to exemplary embodiments of the present invention, the second cathode active material may include a second lithium metal oxide having a single particle structure.

For example, the single particle structure may include a single crystalline structure or a structure in which a plurality of crystals are fused together as one particle. Preferably, the single crystal structure may have improved life-span and penetration stability.

In the present invention, the single particle structure (e.g., a single crystalline structure) of a cathode active material may indicate a structure in which one lithium metal oxide grain function as a cathode active material.

FIG. 1 shows an image of a general structure of a cathode active material, and FIG. 2 shows an image of a structure of a cathode active material having a single particle structure.

Figure 1B:
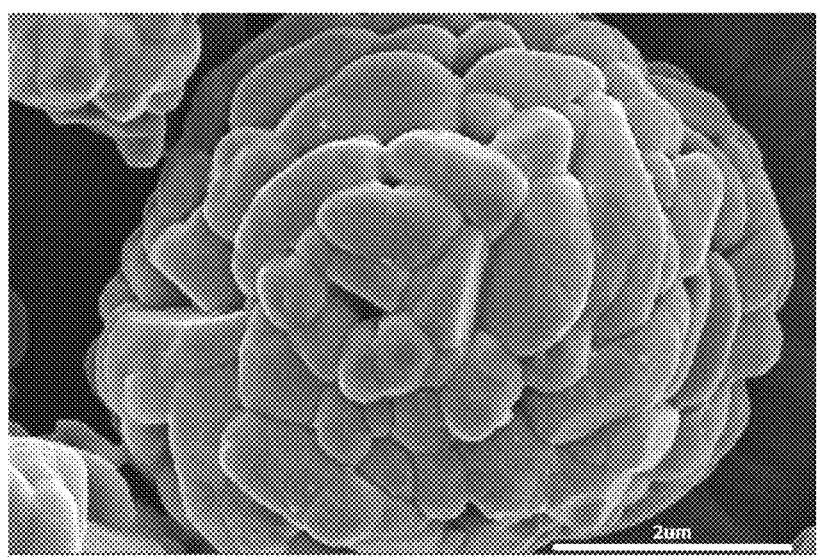
Figure 2A:
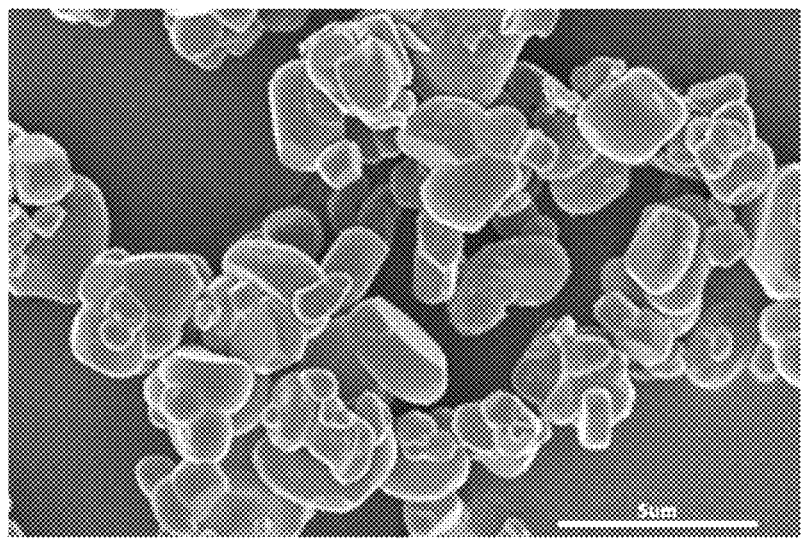
FIGS. 2A and 2B are SEM images of lithium metal oxide having a single crystalline structure in accordance with exemplary embodiments.
Figure 2B:
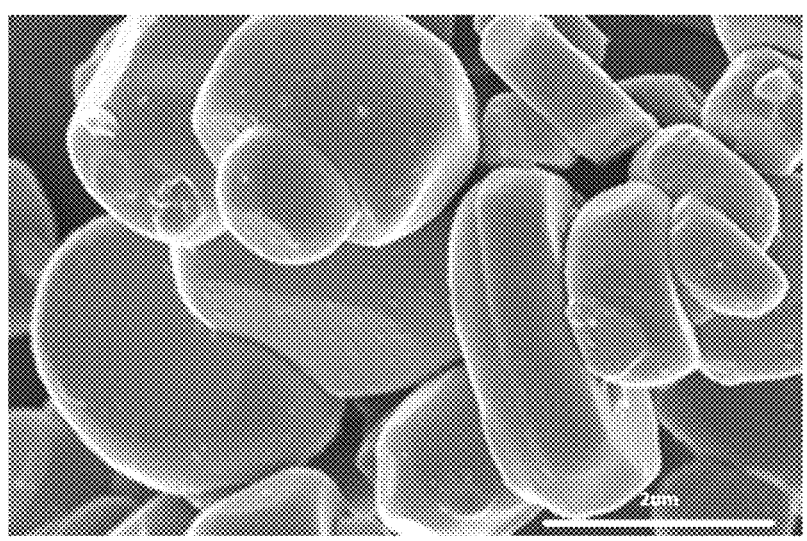

In the cathode active material of FIGS. 1A and 1B, primary particles are aggregated to form a secondary particle, and the secondary particle may function as a cathode active material particle. However, in the cathode active material of FIGS. 2A and 2B, the primary particle may function as a cathode active material particle.

According to an embodiment of the present invention, the second cathode active material having a single particle structure may be superior in heat resistance to a cathode active material of a secondary particle type, to improve safety of a battery. For example, the cathode active material having the single particle structure may have an exothermic peak of 25 J/g or less at a temperature above 320° C. in a DSC measurement.

Therefore, the cathode active material having the single particle structure according to the present invention may improve overcharge and penetration stability of the battery. For example, when a secondary battery using mixture of a conventional cathode active material (e.g., secondary particle type) and the first cathode active material is penetrated, overcurrent may be occurred. Therefore, a large amount of heat energy is generated in a short time due, so that the secondary battery may be ignited or exploded. However, when the second cathode active material and the first cathode active material are blended, the amount of heat energy is remarkably reduced even if the secondary battery is penetrated and overcurrent flows. Therefore, it is possible to prevent the battery from easily igniting.

In an embodiment of the present invention, a second lithium-metal oxide having a single particle structure may be represented by Chemical Formula 2.

$$\text{Li}_x\text{Ni}_a\text{Co}_b\text{Mn}_c\text{M4}_d\text{M5}_e\text{O}_y \quad \text{[Chemical Formula 2]}$$

In Chemical Formula 2 above, M4 may include at least one selected from Ti, Zr, Al, Mg or Cr, M5 may include at least one selected selected from Sr, Y, W or Mo, $0<x<1.5$, $2\le y \le 2.02$, $0.313\le a\le 0.353$, $0.313\le b\le 0.353$, $0.313\le c\le 0.353$, $0\le d\le 0.03$, $0\le e\le 0.03$ and $0.98\le a+b+c\le 1.02$.

In some embodiments, a second lithium metal oxide of a single particle structure may comprise nickel (Ni), cobalt (Co) and manganese (Mn) having the same molar ratio as metal components. For example, the second lithium metal oxide may include $\text{Li}_{1.0}\text{Ni}_{1/3}\text{Co}_{1/3}\text{Mn}_{1/3}\text{O}_2$.

By blending the second cathode active material having the single particle structure and the first cathode active material in which at least one of the above-described metal has a concentration gradient region between the central portion and the surface portion, it may be possible to obtain improved life-span, overcharging and penetration stability.

In some embodiments, particle size of the second lithium metal oxide is not specifically limited, for example, about 3 μm to about 10 μm.

In some embodiments, a second cathode active material may further include a coating layer on a second lithium metal oxide. The coating layer may be formed by including metals or metal oxides. For example, the coating layer may include Al, Ti, Ba, Zr, Si, B, Mg, P, an alloy thereof or an oxide thereof. These may be used alone or in a mixture thereof.

A cathode active material according to the exemplary embodiments of the present invention may include a first cathode active material and a second cathode active material in a weight ratio of 80:20 to 10:90, to exhibit improved life-span, the first cathode active material and the second cathode active material may be mixed in a weight ratio of 50:50 to 10:90. More preferably, when the weight ratio is from 50:50 to 10: 90, improved life-span can be obtained.

<Anode>

The anode according to embodiments of the present invention may include an anode active material, and any material known in the art capable of absorbing and desorbing lithium ions may be used as the anode active material, without any particular limitation. For example, carbon materials such as crystalline carbon, amorphous carbon, carbon composites and carbon fibers, lithium metal, alloys of lithium and other elements, silicon or tin, and the like. Examples of the amorphous carbon may include hard carbon, cokes, mesocarbon microbead (MCMB) fired at 1500° C. or lower, and mesophasepitch-based carbon fiber (MPCF). Crystalline carbon may include graphite-based materials, specifically natural graphite, graphitized coke, graphitized MCMB, and graphitized MPCF. As another element constituting the alloy with lithium, aluminum, zinc, bismuth, cadmium, antimony, silicon, lead, tin, gallium or indium may be used.

<Lithium Secondary Battery>

The lithium secondary battery according to some embodiments of the present invention may include a cathode, an anode, and a nonaqueous electrolyte solution, and may include a cathode active material and an anode active material according to the some embodiments of the present invention described above.

A cathode slurry and an anode slurry may be prepared by mixing and stirring a solvent, a binder, a conductive material and dispersion agent with a cathode active material and an anode active material according to the present invention, respectively. A cathode and an anode may be produced by drying and compressing the cathode slurry and the anode slurry.

The binder used in the art may be used without any particular limitation. For example, an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

The conductive material may include a conventional conductive carbon material without any particular limitation.

The current collector may be a metal having high conductivity and easily adhered to a mixture of a cathode active material and an anode active material, and any material not reactive in the voltage range of the battery can be used. Non-limiting examples of a cathode current collector include foil made of aluminum, nickel or a combination thereof. Non-limiting examples of an anode current collector include foil made of copper, gold, nickel, a copper alloy or a combination thereof.

The separator may be interposed between a cathode and an anode. As the separator, a conventional porous polymer film may be used. For example, a porous polymer film made of a polyolefin-based polymer such as an ethylene homopolymer, a propylene homopolymer, an ethylene/butene copolymer, an ethylene/hexene copolymer and an ethylene/methacrylate copolymer may be used alone or in lamination. And nonwoven fabrics made of conventional porous nonwoven fabrics such as glass fibers having a high melting point, polyethylene terephthalate fibers or the like can be used, but the present invention is not limited thereto. As a method of applying the separator to a battery, lamination, stacking and folding of a separator and an electrode may be used in addition to general winding.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, sulfolane, gamma-butyrolactone, tetrahydrofuran, etc. These may be used alone or in a combination thereof.

The nonaqueous electrolyte solution may be injected into an electrode structure made up of a cathode, an anode, and a separator interposed between the cathode and the anode to manufacture a lithium secondary battery. An external shape of the lithium secondary battery of the present invention is not particularly limited, but may be a cylindrical shape using a can, a square shape, a pouch shape, a coin shape, or the like.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES

A lithium metal oxide in which had a total composition of $LiNi_{0.80}Co_{0.11}Mn_{0.09}O_2$, a central portion composition of $LiNi_{0.802}Co_{0.11}Mn_{0.088}O_2$, a surface portion composition of $LiNi_{0.77}Co_{0.11}Mn_{0.12}O_2$, and a concentration gradient of nickel and manganese in the region between the central portion and the surface portion (hereinafter referred to as Cathode 1) was prepared.

A lithium metal oxide having a composition of $Li_{1.0}Ni_{1/3}Co_{1/3}Mn_{1/3}O_2$, an average particle diameter ($D_{50}$) of 6 μm and having a single particle structure (hereinafter referred to as Cathode 2) was prepared.

The first cathode active material (cathode 1) and the second cathode active material (cathode 2) were mixed at a weight ratio as shown Table 1 below, to prepare a cathode active material.

The cathode active material:Denka Black (conductive material):PVDF (binder) was mixed in a mass ratio of 92:5:3 to prepare a cathode slurry.

The cathode slurry was coated on an aluminum substrate, dried and pressed to prepare a cathode.

The density of the cathode after pressing was controlled to above 3.5 g/cc.

An anode slurry containing 93% by weight of natural graphite (negative electrode active material), 5% by weight of KS6 (flake type conductive material), 1% by weight of styrene-butadiene rubber (SBR, binder) and 1% by weight of carboxymethylcellulose (CMC, thickener) was coated on a copper substrate, dried and pressed to prepare an anode.

The cathode and the anode were laminated and notched at an appropriate size. A cell was formed by interposing a separator (polyethylene, thickness: 25 mu m) between the cathode and the anode. A tab portion of the cathode and the tab portion of the anode were respectively welded.

An electrode assembly of the welded anode/separator/cathode was put into a pouch and three surfaces excluding an electrolyte solution injecting surface were sealed. At this time, the tab portion is included in the sealing portion.

An electrolyte was injected into the electrolyte solution injecting surface, and the electrolyte solution injecting surface was sealed.

The electrode assembly was impregnated for 12 hours or more.

The electrolyte solution were 1 M $LiPF_6$ solution of a mixed solvent of EC/EMC/DEC (25/45/30; volume ratio) and added 1 wt % of vinylene carbonate (VC) and 0.5 wt % of 1,3-propensulfone (PRS) and 0.5 wt % of lithium bis(oxalate) borate (LiBOB) thereto.

Comparative Examples

A lithium metal oxide having a secondary particle structure formed from a plurality of primary particles and a composition of $Li_{1.0}Ni_{1/3}Co_{1/3}Mn_{1/3}O_2$ (hereinafter referred to as Cathode 2') was prepared.

The first cathode material (Cathode 1) and the second cathode active material (cathode 2) were mixed at a weight ratio as shown Table 1 below, to prepare a cathode active material.

And a lithium secondary battery was fabricated in the same ways of Examples.

In Comparative Example 10, the second cathode active material was not used, and in Comparative Example 11, the first cathode active material was not used.

Experimental Example (1) Evaluation of Life-Span

The battery cells prepared as described above were repeatedly charged (CC-CV 1.0 C 4.2 V 0.05 C CUT-OFF) and discharged (CC 1.0 C 2.7 V CUT-OFF) 500 times, and then a discharging capacity at a 500th cycle was calculated as a percentage (%) with respect to a first cycle discharging capacity to measure the life-span at a room temperature.

(2) Evaluation of Penetration Stability

The battery cells of Example and Comparative Examples were charged (1C 4.2V 0.1C CUT-OFF), and then the battery cells were penetrated by a nail having a diameter of 3 mm at a speed of 80 mm/sec and evaluated according to the following criteria.

<EUCAR Hazard Level>

L1: No problem with battery performance

L2: Irreversible damage to battery performance

L3: The electrolyte of the battery is reduced by less than 50%.

L4: The electrolyte of the battery is reduced by 50% or more.

L5: Ignited or exploded

TABLE 1

| | First Cathode active material | Second Cathode active material | Blending ratio (wt %) | Life-span (%) (500 cycle) | Penetration Stability |
|---|---|---|---|---|---|
| Example 1 | Cathode 1 | Cathode 2 | 80:20 | 92.8% | L3 |
| Example 2 | Cathode 1 | Cathode 2 | 70:30 | 94.7% | L3 |
| Example 3 | Cathode 1 | Cathode 2 | 60:40 | 96.0% | L3 |
| Example 4 | Cathode 1 | Cathode 2 | 50:50 | 97.1% | L3 |
| Example 5 | Cathode 1 | Cathode 2 | 40:60 | 98.2% | L3 |
| Example 6 | Cathode 1 | Cathode 2 | 30:70 | 99.1% | L3 |
| Example 7 | Cathode 1 | Cathode 2 | 20:80 | 99.5% | L3 |
| Example 8 | Cathode 1 | Cathode 2 | 10:90 | 99.8% | L3 |
| Comparative Example 1 | Cathode 1 | Cathode 2' | 90:10 | 75.8% | L5 |
| Comparative Example 2 | Cathode 1 | Cathode 2' | 80:20 | 77.1% | L5 |
| Comparative Example 3 | Cathode 1 | Cathode 2' | 70:30 | 78.6% | L5 |
| Comparative Example 4 | Cathode 1 | Cathode 2' | 60:40 | 79.7% | L5 |
| Comparative Example 5 | Cathode 1 | Cathode 2' | 50:50 | 80.7% | L4 |
| Comparative Example 6 | Cathode 1 | Cathode 2' | 40:60 | 82.3% | L4 |
| Comparative Example 7 | Cathode 1 | Cathode 2' | 30:70 | 83.5% | L4 |
| Comparative Example 8 | Cathode 1 | Cathode 2' | 20:80 | 84.7% | L4 |
| Comparative Example 9 | Cathode 1 | Cathode 2' | 10:90 | 88.1% | L4 |
| Comparative Example 10 | Cathode 1 | — | — | 98.2% | L5 |
| Comparative Example 11 | — | Cathode 2 | — | 98.0% | L3 |

Referring to Table 1, it can be seen that the batteries of Examples 1 to 8 exhibit improved life-span, penetration and overcharge stability as compared with the Comparative Examples. Further, in Examples 6 to 8 in which the mixing weight ratio (cathode 1: cathode 2) was 30:70 to 10:90, penetration stability, output characteristics appeared satisfactorily and the life-span were remarkably improved (99% or higher).

(3) DSC (Differential Scanning Calorimetry) Analysis

Figure 3:
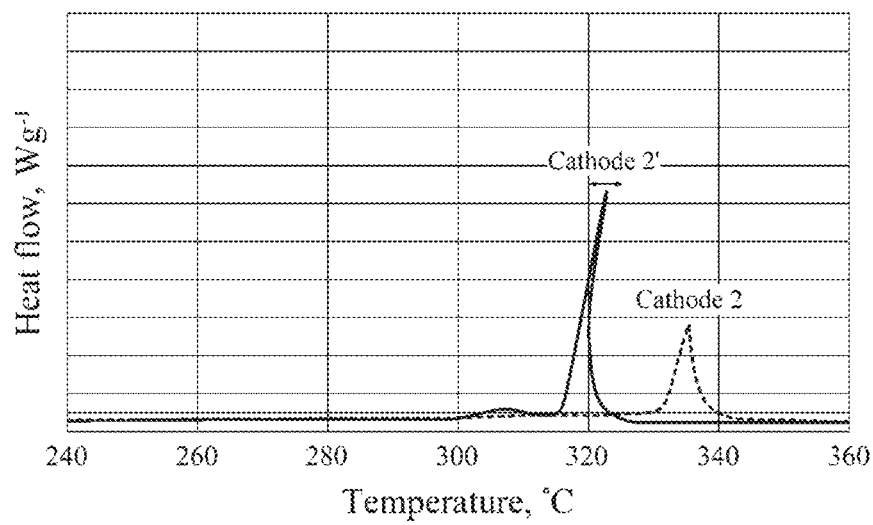
FIG. 3 is a DSC (Differential Scanning calorimetry) analysis graph of a second cathode active material in accordance with some exemplary embodiments, and a conventional cathode active material.

Cathode 2 and Cathode 2' was analyzed by DSC and the result are shown in FIG. 3.

Referring to FIG. 3, it can be seen that the Cathode 2 shows an exothermic peak at 330° C. or higher in DSC measurement. This was higher than the temperature of the exothermic peak of the Cathode 2'. The calorific value was also found to be less than half of that of the Cathode 2'.

(4) Overcharging Stability Evaluation

The batteries of Example 8 and Comparative Example 8 were charged from SOC (State of Charge) of 0% by a charging voltage of 6 V for 2.5 hours until SOC reached 100%, to carry out an overcharge test. The results are shown in FIG. 4.

Figure 4A:
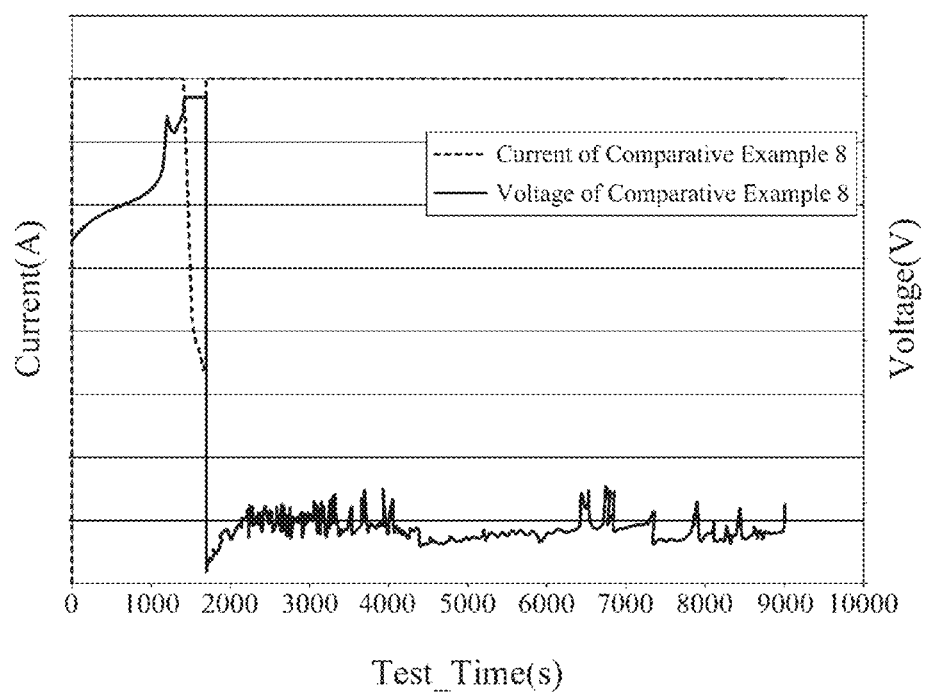
FIGS. 4A and 4B are graphs showing overcharging evaluation of batteries in accordance with Comparative Example 8 and Example 8, respectively.
Figure 4B:
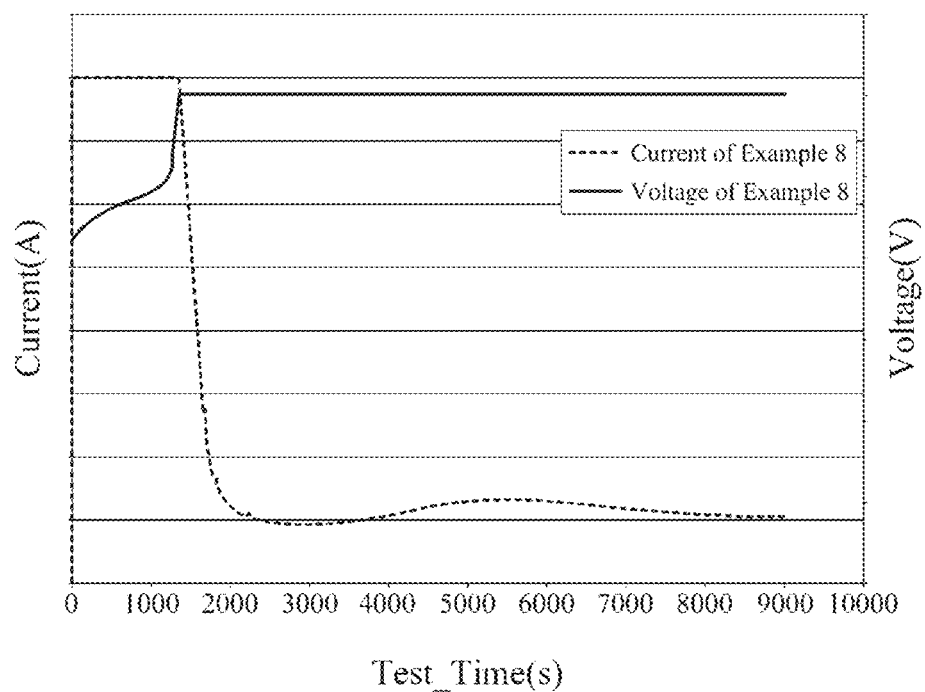

Referring to FIG. 4, the battery of Example 8 did not ignite (L3) (FIG. 4B), but the battery of Comparative Example 8 ignited (L4) (FIG. 4A).

What is claimed is:

1. A cathode active material for a lithium secondary battery, comprising:
    a first cathode active material including a first lithium metal oxide containing nickel and including a concentration gradient region between a central portion and a surface, the first lithium metal oxide having a secondary particle structure; and
    a second cathode active material including a second lithium metal oxide containing nickel, cobalt, and manganese, the lithium metal oxide having a single particle structure,
    wherein a content of nickel at an entire region of the first cathode active material is greater than a content of nickel included in the second cathode active material,
    wherein a blending weight ratio of the first cathode active material and the second active material is in a range from 30:70 to 10:90,
    wherein a molar ratio of manganese included in the second cathode active material relative to a total number of moles of metals included in the second cathode active material excluding lithium is 0.313 to 0.353.

2. The cathode active material for a lithium secondary battery according to claim 1, wherein the single particle structure includes a single crystalline structure.

3. The cathode active material for a lithium secondary battery according to claim 1, wherein the first lithium metal oxide is represented by Chemical Formula 1:

$$Li_xM1_aM2_bM3_cO_y \quad \text{[Chemical Formula 1]}$$

wherein in Chemical Formula 1, at least one of M1, M2 and M3 has a concentration gradient region between a central portion of the first metal oxide and a surface portion of the first metal oxide, and M1, M2 and M3 are selected from Ni, Co, Mn, Na, Mg, Ca, Ti, V, Cr, Cu, Zn, Ge, Sr, Ag, Ba, Zr, Nb, Mo, Al, Ga or B, $0<x\le1.1$, $2\le y\le2.02$, $0\le a\le1$, $0\le b\le1$, $0\le c\le1$, and $0<a+b+c\le1$.

4. The cathode active material for a lithium secondary battery according to claim 3, wherein M1 is Ni, $0.6\le a\le0.95$ and $0.05\le b+c\le0.4$ in Chemical Formula 1.

5. The cathode active material for a lithium secondary battery according to claim 3, wherein M1 is Ni, $0.7\le a\le0.9$ and $0.1\le b+c\le0.3$ in Chemical Formula 1.

6. The cathode active material for a lithium secondary battery according to claim 1, wherein the second lithium metal oxide is represented by Chemical Formula 2:

$$Li_xNi_aCo_bMn_cM4_dM5_eO_y \quad \text{[Chemical Formula 2]}$$

wherein, in Chemical Formula 2, M4 includes at least one selected from Ti, Zr, Al, Mg or Cr, M5 includes least one selected from Sr, Y, W or Mo, $0<x<1.5$, $2\le y\le2.02$, $0.313\le a\le0.353$, $0.313\le b\le0.353$, $0.313\le c\le0.353$, $0\le d\le0.03$, $0\le e\le0.03$ and $0.98\le a+b+c\le1.02$.

7. The cathode active material for a lithium secondary battery according to claim 6, wherein the second lithium metal oxide includes $Li1.0Ni⅓Co⅓Mn⅓O2$.

8. The cathode active material for a lithium secondary battery according to claim 1, wherein the second cathode active material has a primary particle shape.

9. The cathode active material for a lithium secondary battery according to claim 1, wherein the second cathode active material shows an exothermic peak of 25 J/g or less at 320° C. or more in a DSC measurement.

10. The cathode active material for a lithium secondary battery according to claim 1, wherein the first cathode active material further includes a doping containing at least one selected from the group consisting of Al, Ti, Ba, Zr, Si, B, Mg, P, V and W.

11. The cathode active material for a lithium secondary battery according to claim 1, wherein the first cathode active material further includes a coating layer containing at least one selected from the group consisting of Al, Ti, Ba, Zr, Si, B, Mg and P.

12. A lithium secondary battery, comprising:
a cathode including a cathode active material according to claim 1;
an anode; and
a separator interposed between the cathode and the anode.

13. The lithium secondary battery of claim 12, wherein the anode comprises a current collector adhered to an anode active material.

* * * * *